UNITED STATES PATENT OFFICE.

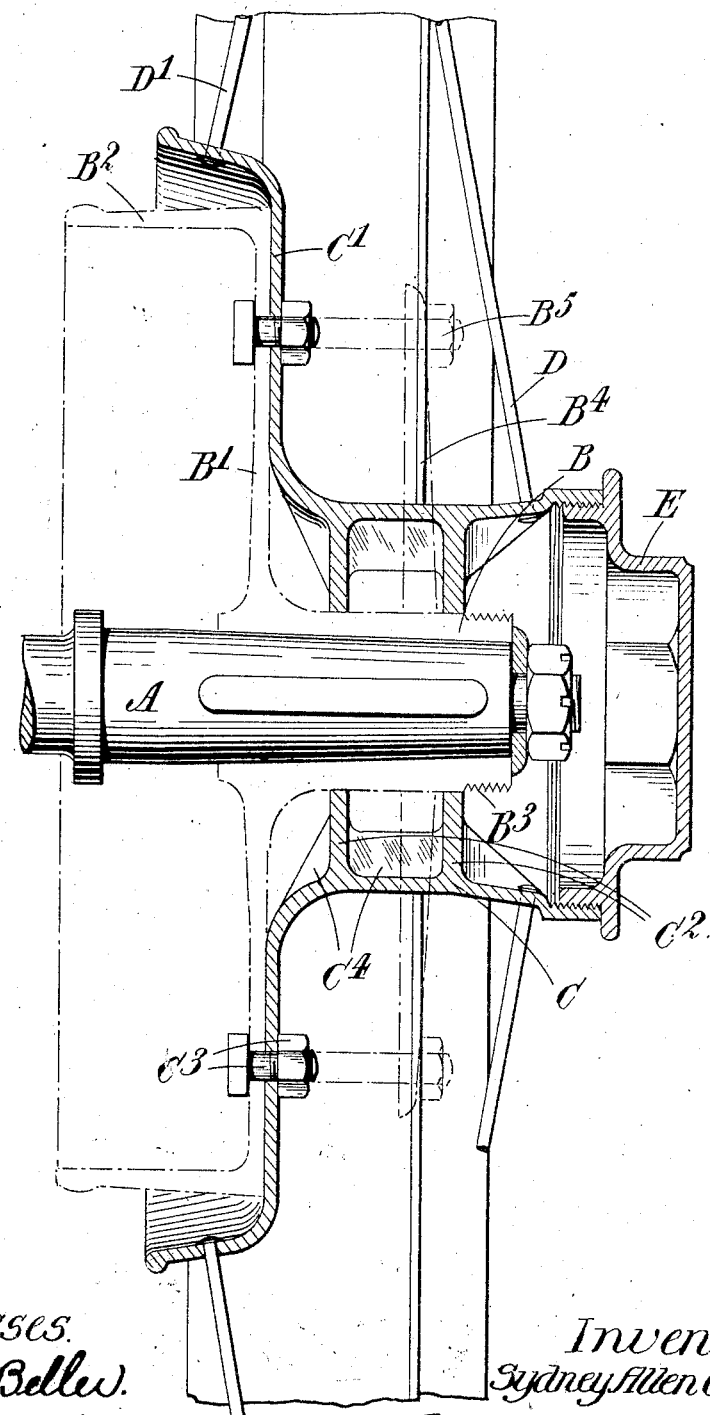

SYDNEY ALLEN CURRIN, OF BRISTOL, ENGLAND.

HUB FOR WIRE WHEELS.

1,037,733.
Specification of Letters Patent.
Patented Sept. 3, 1912.

Application filed April 14, 1911. Serial No. 621,145.

*To all whom it may concern:*

Be it known that I, SYDNEY ALLEN CURRIN, a subject of the King of England, residing at Bristol, England, have invented certain new and useful Improvements in Hubs for Wire Wheels, of which the following is a specification.

This invention is for improvements in or relating to hubs for wire wheels for motor vehicles.

According to this invention a wire-wheel hub is so constructed that it can be readily applied to the existing parts of a wooden-wheel hub.

As is well known a wooden-wheel hub usually consists of the hub proper or sleeve that fits upon the shaft or accommodates a bearing therefor, a fixed flange of large diameter being provided on the inner or vehicle end of the sleeve. The spokes are held in place against this flange by an outer plate that passes over the sleeve and is bolted to the flange. Such a hub is unsuitable for the accommodation of wire spokes and according to one method of carrying out the present invention a wire-wheel hub can be applied to such a wooden-wheel hub by merely removing the outer plate with the spokes and felly and substituting for the bolts that secured this plate shorter bolts or rivets for securing the new hub.

In the accompanying drawing which illustrates one method of carrying out this invention the original wooden hub members are shown in chain lines and the new parts in full lines.

The shaft A has keyed upon it the hub proper or sleeve B. This sleeve has on its inner end, that is the end toward the vehicle, a flange $B^1$ of large diameter and if the wheel is a driving wheel the flange is made in the form of a drum having a braking surface $B^2$. The outer end of the sleeve is screw-threaded at $B^3$ to receive the axle-cap and a plate $B^4$ that is passed over the sleeve holds the wood spokes in place between it and the flange $B^1$, the plate being retained in position by bolts and nuts $B^5$.

To apply the wire-wheel hub according to this invention the plate $B^4$, bolts and nuts $B^5$ and the wood spokes and felly are removed and a hub comprising an annular portion C and having a flange $C^1$ at its inner end is slid over the sleeve B. The annular portion has one or more internal flanges $C^2$ (two being shown in the drawing) which are made sufficiently deep so that they can be bored out to fit the sleeve B. The flange $C^1$ lies against the flange $B^1$ and is drilled to receive short bolts and nuts $C^3$ which take the place of the longer bolts and nuts $B^5$.

The annular portion C is made long enough to provide a good wide base for the spokes and the outer edge of the flange $C^1$ is also turned inwardly toward the vehicle to provide a spoke-receiving portion and thus the hub ends of the inner and outer spokes $D^1$ and D can be kept well apart which, as is well known, is essential for giving lateral rigidity to a wire wheel.

The internal flanges $C^2$ can be strengthened by webs $C^4$ and the outer end of the annular member C may be screw-threaded to receive a covering cap E. These covering caps may be made of different depths if desired so that should the sleeve B and shaft A be exceptionally long it can be accommodated by the depth of the cap.

Although it is preferred to use the original holes in the flange $B^1$ for the bolts with their nuts $C^3$ obviously other holes may be provided if desired and rivets can be employed instead of bolts or screws.

The internal flanges $C^2$ give considerable support to the hub and, as already explained, they are easily bored to requisite dimensions so that all that is necessary is to make them of sufficient depth in the first instance so that they can be bored to fit the smallest sleeve B that they are likely to be required for and consequently can be further cut away for larger sleeves.

By this invention therefore a set of wheels on a car can be quickly and cheaply converted from wood to wire. Where the tracking of the wheels would be thrown out by the alteration, packing may be inserted as required between the flanges $B^1$ and $C^1$ or the flange $C^1$ may be otherwise distanced from the flange $B^1$.

Any convenient form of felly may be employed with this hub but as this constitutes no part of the present invention detailed description is unnecessary.

What I claim as my invention and desire to secure by Letters Patent is:—

The combination with a wheel hub comprising a sleeve and a disk portion, of a detachable hub fitted on said wheel hub and comprising an annular portion spaced from said sleeve, inwardly disposed radial flanges formed on said annular portion and having the inner edges thereof fitting against said sleeve portion; a radially disposed flange portion fitting against said disk portion formed integral with said annular portion and having an annular flange on the periphery thereof; said annular flange and the annular hub portion adapted to have the wheel spokes secured thereto; and means for securing the disk of the detachable hub to the disk of the wheel hub, substantially as described.

In testimony whereof I have signed my name to this specification in the presence of two subscribing witnesses.

SYDNEY ALLEN CURRIN.

Witnesses:
HARRY B. BRIDGES,
PERCY HEWITT.